(12) United States Patent
Loo et al.

(10) Patent No.: US 7,747,638 B1
(45) Date of Patent: Jun. 29, 2010

(54) TECHNIQUES FOR SELECTIVELY PERFORMING SEARCHES AGAINST DATA AND PROVIDING SEARCH RESULTS

(75) Inventors: Patrick Loo, Fremont, CA (US); Sotirios Matzanas, San Francisco, CA (US); Ming Zhang, San Ramon, CA (US); Matthias Eichstaedt, Sunnyvale, CA (US); Mitra Naeimi, Hillsborough, CA (US); Jim Fondren, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 694 days.

(21) Appl. No.: 10/964,980

(22) Filed: Oct. 13, 2004

Related U.S. Application Data (60) Provisional application No. 60/524,096, filed on Nov. 20, 2003.

(51) Int. Cl.
*G06F 7/00* (2006.01)
*G06F 17/30* (2006.01)

(52) U.S. Cl. ................................ 707/765; 707/713
(58) Field of Classification Search .................. 707/3, 707/2, 5, 10, 765; 705/26, 27
See application file for complete search history.

(56) References Cited

U.S. PATENT DOCUMENTS

| | | | |
|---|---|---|---|
| 6,381,594 B1* | 4/2002 | Eichstaedt et al. | 707/3 |
| 6,505,190 B1* | 1/2003 | Harel et al. | 707/2 |
| 6,633,867 B1* | 10/2003 | Kraft et al. | 707/3 |
| 6,671,681 B1* | 12/2003 | Emens et al. | 707/5 |
| 6,732,088 B1* | 5/2004 | Glance | 707/3 |
| 6,938,036 B2* | 8/2005 | Dettinger et al. | 707/3 |
| 2002/0016924 A1* | 2/2002 | Shah et al. | 713/200 |
| 2002/0184060 A1* | 12/2002 | Schmitz et al. | 705/6 |
| 2003/0046311 A1* | 3/2003 | Baidya et al. | 707/200 |
| 2003/0144994 A1* | 7/2003 | Wen et al. | 707/3 |

(Continued)

OTHER PUBLICATIONS

Natalie S. Glance, "Community Search Assistant", 2001, ACM Press, New York, USA, Proceedings of the 6th international conference on Intelligent user interfaces, pp. 91-96.*

*Primary Examiner*—John R. Cottingham
*Assistant Examiner*—Hexing Liu
(74) *Attorney, Agent, or Firm*—Hickman Palermo Truong & Becker LLP (57) ABSTRACT

Search queries are received that should be run against data. As time elapses, new queries and new data may be received. Previously run queries may be referred to as base queries and the data that was searched using the queries may be referred to as base data. The base queries and new queries may be parsed to identify queries that are similar. The similar queries are then combined into a unique query so that multiple queries that are similar are not used to search the same data. The unique queries that are generated are used to search the new data received to generate a first set of search results. The new queries received are used to search the base data to generate a second set of search results. The search results for the new queries are then determined based on the first and second set of search results. Also, the search results for the base queries are determined based on the first set results. Accordingly, the base queries used to search the new data received and the new queries are used to search the new data and the base data.

14 Claims, 5 Drawing Sheets

U.S. PATENT DOCUMENTS

| | | | |
|---|---|---|---|
| 2004/0002958 A1* | 1/2004 | Seshadri et al. | 707/3 |
| 2004/0002961 A1* | 1/2004 | Dettinger et al. | 707/3 |
| 2004/0093325 A1* | 5/2004 | Banerjee et al. | 707/3 |
| 2006/0010119 A1* | 1/2006 | Jonas | 707/3 |
| 2006/0036580 A1* | 2/2006 | Stata et al. | 707/3 |
| 2006/0242133 A1* | 10/2006 | Denny et al. | 707/3 |

* cited by examiner

FIG. 5 http://yahoo-alerts-demo.idp.inktomisearch.com:55556/SEARCH?client=yahooalertsdemo&database=news&echo=1&fields=url%2Ctitle.html.hl%2Cabstract.best.html.hl%2Clastmod&firstresult=0&numresults=10&query=yahoo%20search  ⟵ 602

```xml
<?xml version="1.0" encoding="iso-8859-1" ?>                        ⟵ 604
- <SEARCHRESPONSE xmlns="http://www.inktomi.com/"
    responseCode="200">
  - <HEADER>
      <DBSPEC>100%www</DBSPEC>
      <DEGRADATION>terminated 0, wordskipped 0, adjskipped
        0</DEGRADATION>
      <FIRSTRESULT>0</FIRSTRESULT>
      <MASTER>ns1100</MASTER>
      <NUMRESULTS>10</NUMRESULTS>
      <QUERY>yahoo search FILTER(restrict==0)
        SADJUST(blacklist,-100)</QUERY>
      <TIMEOUTS>wordcount 0, docid 0, docdata 0</TIMEOUTS>
      <TOTALHITS>145666</TOTALHITS>
    - <WORDCOUNTS>
        <WORD count="142723">search</WORD>
        <WORD count= "67932">yahoo</WORD>
      </WORDCOUNTS>
    </HEADER>
  - <RESULTS>
    - <RESULT>
      - <ABSTRACT.BEST. HTML.HL>
        - <![CDATA[

SAN FRANCISCO (CBS.MW) -- Not since <b>Yahoo<Ib> went
            public as a <b>search</b>-engine operator in 1996 has the core
            <b>search</b> functionality been a main focus at the online
            media company. ... The new <b>Yahoo</b> <b>Search</b>
            service incorporates some of the technology of Inktomi, the
            <b>search</b>-technology company <b>Yahoo</b> ...
          ]]>
        </ABSTRACT. BEST. HTML.HL>
        <LASTMOD>2003/04/07 05:15:00</LASTMOD>
      - <TITLE.HTML.HL>
        - <![CDATA[
          Net Stocks: <b>Yahoo<Ib> returning to its roots in <b>search</b>
          ]]>
        </TITLE.HTML.HL>

<URL>http://c.moreover.com/click/here.pl?b669880
          94</URL>
      </RESULT>
    - <RESULT>
      - <ABSTRACT.BEST.HTML.HL>
        - <![CDATA[
          A <b>search</b> for 'real estate' on the new <b>search</b> page
            offers more than just Google algorithmic results and Overture paid
            listings. ... will only crawl <b>Yahoo</b>! pages. In addition,
            <b>Yahoo</b>! <b>Search</b> will feature a beta version of a
            product <b>search</b> engine, ...
          ]]>
        </ABSTRACT. BEST. HTML.HL>
        <LASTMOD> 2003/04/08 15:12:00 </LASTMOD>
      - <TITLE.HTML.HL>
        - <![CDATA[
          <b>Yahoo</b>! Unveils New <b>Search</b>
          ]]>
        </TITLE. HTML.HL>

<URL>http:/ /c.moreover.com/click/here.pl?b671848
          53</URL>
      </RESULT>
     -<RESULTS>
  </SEARCHRESPONSE>
```

Labels: 606 (HEADER block), 608 (first RESULT), 610 (second RESULT)

FIG. 6

TECHNIQUES FOR SELECTIVELY PERFORMING SEARCHES AGAINST DATA AND PROVIDING SEARCH RESULTS

CROSS-REFERENCES TO RELATED APPLICATIONS

This application claims priority from U.S. Provisional Patent Application No. 60/524,096 filed Nov. 20, 2003 entitled "Techniques For Selectively Performing Searches Against Data And Providing Search Results" which is hereby incorporated by reference, as if set forth in full in this document, for all purposes.

The following applications are incorporated by reference, as if set forth in full in this document, for all purposes:

U.S. patent application Ser. No. 10/866,064, filed Jun. 11, 2004, entitled "Method and System for Alert Delivery Architecture" (hereinafter "Alerts Application #1");

U.S. patent application Ser. No. 10/866,065, filed Jun. 11, 2004, entitled "Method and System for Data Collection for Alert Delivery" (hereinafter "Alerts Application #2"); and U.S. patent application Ser. No. 10/866,066, filed Jun. 11, 2004, entitled "Method and System for Delivery Alerts to a User" (hereinafter "Alerts Application #3").

BACKGROUND OF THE INVENTION

The present invention relates to search engines, and more specifically, to a search engine capable of efficiently searching a stream of information content for information matching search queries from a plurality of users.

A search engine is a program that helps users find information in an information network. Users submit search queries comprising words or phrases indicating what they are searching for, and the search engine replies with a list of Web pages it predicts are relevant to that query. A page considered by a search engine for inclusion in this list can be termed a "target page". The list of Web pages returned by a search engine is ranked by relevancy. Typically, relevancy is determined mostly by the content of the target pages. For example, if the user searches for the phrase "chocolate cake", a typical search engine may rank pages containing the phrase "chocolate cake" before those which merely contain the words "chocolate" and "cake" separately, and those pages will in turn be ranked higher than pages that contain one of the two words but not the other.

Today many sites on the Internet offer large volumes of time sensitive content, such as financial news, business news, real-time weather reports, and other types of streaming media content. However, current search systems may operate very inefficiently when handling a large volume of user requests.

One problem with current search systems occurs when one or more users want to perform the same or similar searches periodically over time to find the most recent information that becomes available. This is referred to as a "persistent query." Typical search systems fail to efficiently handle persistent queries from a large number of users.

BRIEF SUMMARY OF THE INVENTION

Embodiments of the present invention relate to a search engine configured to run search queries over a stream of information content. In one embodiment, search queries are received that should be run against data. As time elapses, new queries and new data may be received. Previously run queries may be referred to as base queries and the data that was searched using the queries may be referred to as base data. The base queries and new queries may be parsed to identify queries that are similar. The similar queries are then combined into a unique query so that multiple queries that are similar are not used to search the same data. The unique queries that are generated are used to search the new data received to generate a first set of search results. The new queries received are used to search the base data to generate a second set of search results. The search results for the new queries are then determined based on the first and second set of search results. Also, the search results for the base queries are determined based on the first set results. Accordingly, the base queries used to search the new data received and the new queries are used to search the new data and the base data.

The search results are then formatted according to user preferences. The formatted search results are sent the users who submitted the search queries.

A further understanding of the nature and the advantages of the inventions disclosed herein may be realized by reference of the remaining portions of the specification and the attached drawings.

BRIEF DESCRIPTION OF THE DRAWINGS

FIG. 6 depicts an example of a query and query results according to one embodiment of the present invention.

DETAILED DESCRIPTION OF THE INVENTION

Figure 1:
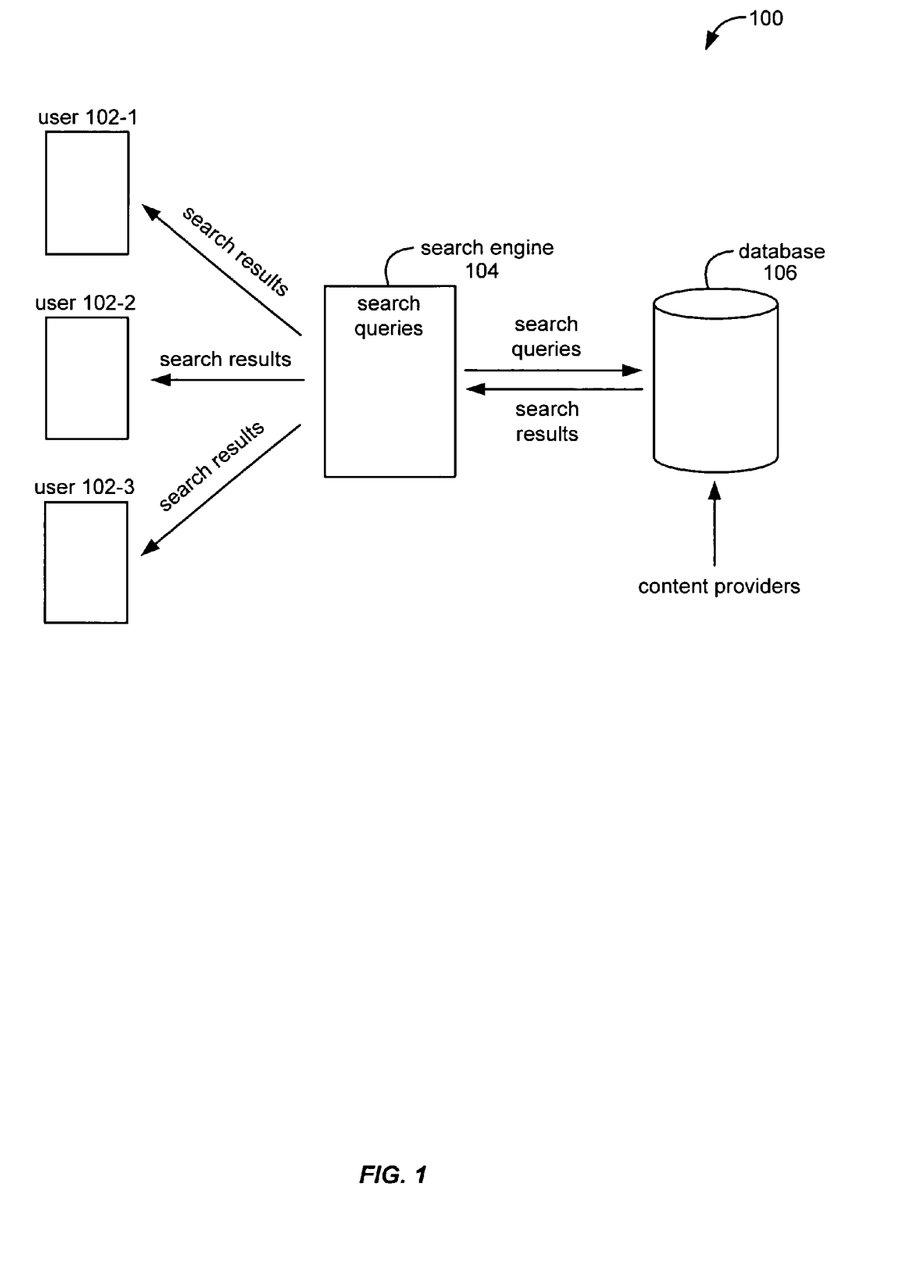
FIG. 1 depicts a system for performing searches according to one embodiment of the present invention.

FIG. 1 depicts a system 100 for performing searches according to one embodiment of the present invention. As shown, system 100 includes one or more users 102, a search engine 104, and a database 106.

Search engine 104 is configured to perform searches using search queries with data in database 106. The search results are then sent to users 102-1, 102-2, and 102-3. Although users 102-1, 102-2, and 102-3 are shown, it will be understood that any number of users may have searches performed by search engine 104.

In one embodiment, users 102 may provide search engine 104 with search queries that may be performed periodically over time. These queries may be referred to as persistent queries. The queries are stored in search engine 104 and when it is time to perform a search, search engine 104 determines queries that should be run. The queries are then used to search data in database 106. Although it is described that search queries are persistent, it will be recognized that search engine 104 may also run searches with non-persistent search queries. For example, one time queries may be used to search data in database 106 along with persistent search queries.

Database 106 includes any information. For example, content providers may provide content information, such as news, business, financial, weather broadcast information, or any other type of information that is stored in database 106. Content servers may stream information over time to an entity that then stores the data in database 106. For example, stock quotes may be streamed every fifteen minutes. Also, breaking news headlines may be sent when a new story breaks.

Although one database 106 is shown, it will be understood that multiple databases 106 may be used. For example, a database 106 may be considered the Internet. In one embodiment, an entity may use a search engine crawler to search web pages on the Internet. When a page is found, it is indexed and the index is stored in database 106. Many entities, such as Google, Yahoo!, etc., may use search crawlers to index information that is found on the Internet. In another embodiment, information is received from content providers as described above. The information is then indexed and stored in database 106. In one embodiment, techniques for indexing information are disclosed in Alerts Applications #1, #2 and #3.

Users 102 may interact with search engine 104 through a network, such as the Internet or any other communication network, using any device. Examples of devices include a desktop personal computer, workstation, cellular telephone, personal digital assistant (PDA), laptop, or any other computing device capable of interfacing directly and indirectly to a communication network. Devices may also include software that enables a user 102 to interface with search engine 104. For example, an Internet browser may be used to receive search results and also to send search queries to search engine 104.

In one embodiment, queries are run periodically. In the time after queries are run, new data and new queries may be received. In one embodiment, the new queries and previously-run queries ("base queries") are used to search the new data. The new queries are also used to search the base data. Accordingly, in one embodiment, all queries are not used to search the base data.

Figure 2:
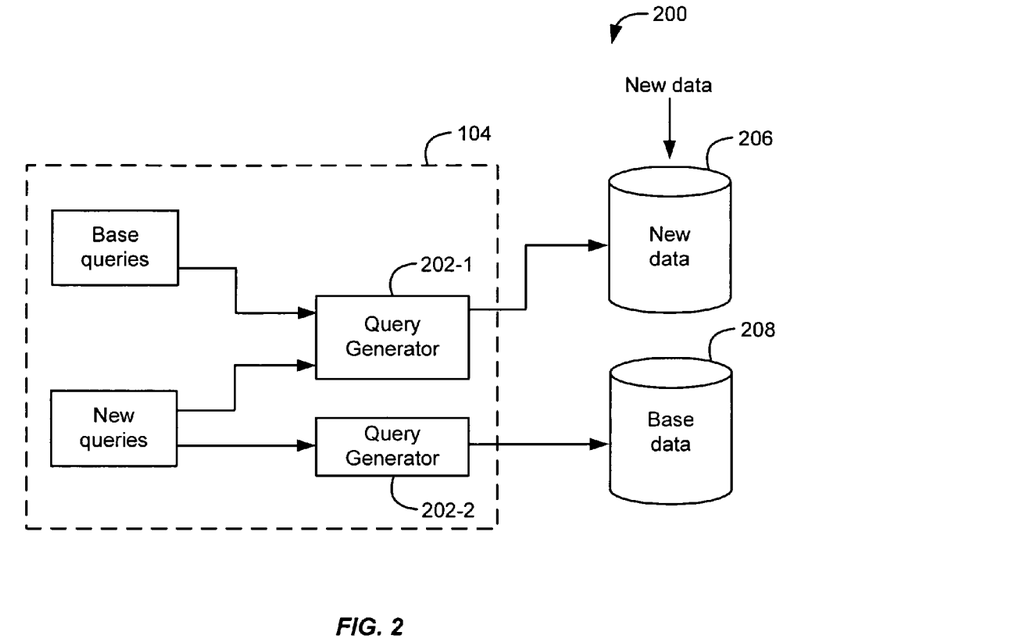
FIG. 2 depicts a system that perform search queries against new and base data according to one embodiment of the present invention.

FIG. 2 depicts a system 200 that perform search queries against new and base data according to one embodiment of the present invention. As shown, search engine 104 includes a query generator 202-1 and a query generator 202-2. Although two query generators 202 are shown, it will be understood that any number of query generators may be used and the two query generators 202-1 and 202-2 are shown for illustrative purposes only. It will be understood that the functions of query generator 202-1 and 202-2 may be combined into a single query generator or multiple query generators.

Database 206 includes new data. In one embodiment, new data may refer to data that has been received after a query has been used to search data. For example, as described below, queries may be used to search new data and base data. The new data is then considered base data after the search performed and any new data received or determined after the search is considered "new data". Also, the base data includes data that has not been queried using the new queries. Although database 206 and 208 are shown, it will be understood that any number of databases may be used. For example, a single database may be used but new data and base data may be indexed separately. Also, multiple databases may be used and processes may determine which data should be considered new data and base data. For example, time information for when a document was created may determine whether data is new data or base data (i.e., if a document was created after a last query was performed).

Examples of new data may be a streaming news feed or financial information feed where new data is continuously received over time. A query may be run on existing data and after that query is run, the news feed continues to send news updates. The new news updates are then considered new data.

Query generator 202-1 is configured to receive base queries and new queries. Query generator 202-1 is then configured to generate the queries that may used to search the new data found in database 206. The process of generating queries will be described in more detail below. Query generator 202-2 is configured to receive new queries and then is configured to generate the queries that may be used to search the base data in database 208.

Accordingly, the new queries and base queries are used to search new data, and new queries are used to search base data. Thus, base queries are not used to query base data in one embodiment. One reason why base queries are not used to search base data is that when queries are run periodically, the base queries may have already been used to search the base data. Thus, the search results using the base queries have already been determined and have been sent to the user. These search results do not need to be re-sent in most cases. However, it will be recognized that the based queries can be re-run.

In one embodiment, query generator 202-1 and 202-2 are configured to determine unique queries from base queries and/or new queries. For example, when it is determined that queries should be used to search new data or base data, query generator 202-1 or 202-2 determines all queries that need to be performed at that time. The queries are then parsed to determine a set of search queries that should be run based on the eligible queries. In one embodiment, query generator 202-1 may combine base queries and new queries to generate unique queries that are used to search the new data. Also, in another embodiment, unique queries may be generated from base queries and unique queries may be generated from new queries. The two sets of unique queries may then be used to search the new data.

In one embodiment, the eligible queries are parsed to determine similar queries that may yield similar results. For example, queries that are semantically the same or include synonyms are determined. In one example, if a first query is "Bush and Iraq" and a second query is "Iraq and Bush", the queries would be semantically the same and may yield the same results. The two queries thus do not need to be used to search the same data. A unique query that would yield similar results as either query is determined. For example, a query of "Bush and Iraq" may be used for both the first and second queries.

Additionally, query generator 2021 may determine queries that include synonyms that may yield similar results. For example, the search queries "gravel road" and "gravel street" may yield similar results. A unique query of "gravel road" may be used in place of the two similar queries.

In one embodiment, techniques for generating unique queries are disclosed in Alerts Applications #1, #2, and #3.

Figure 3:
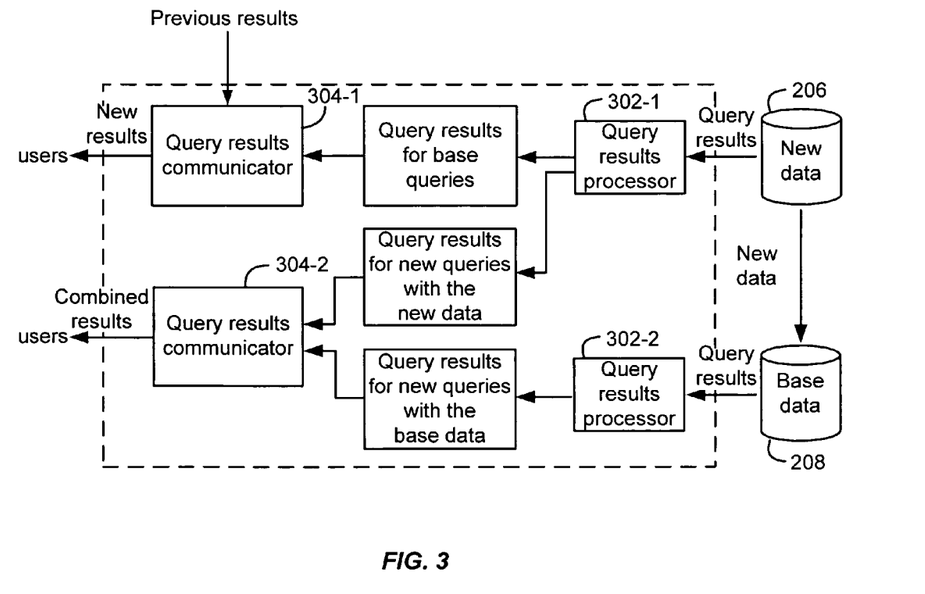
FIG. 3 depicts a system for processing query results according to one embodiment of the present invention.

FIG. 3 depicts a system 300 for processing query results according to one embodiment of the present invention. As shown, search engine 104 includes query results processors 302-1 and 302-2 and query results communicators 304-1 and 304-2. Although multiple query results processors 302 and query results communicators 304 are shown, it will be understood that any number of query results processors 302 and query results communicators 304 may be used.

Query results processor 302-1 is configured to receive query results for queries performed on new data found in database 206. In one embodiment, because unique queries for new and base queries are used to search the new data, the queries results for base queries and new queries may be separated. In another embodiment, if unique queries were generated separately for both the base queries and new queries, then query results for the new and base queries do not need to be separated. The new queries may also have been used to search the base data. Thus, the query results for the new queries for the new data and base data may then be combined in one embodiment.

Query results processor 302-1 may also take the query results for the unique queries and associate them with queries for users. Because multiple queries may have been collapsed into a unique query, the unique query results are associated with each query for a user. The query results for the multiple queries are then sent to query results communicator 304-1 and query results communicator 304-2. In one embodiment, the query results for the base queries are sent to query results communicator 304-1 and the query results for new queries are sent to query results communicator 304-2.

Query results processor 302-2 receives query results from queries used to search base data in database 208. Query results processor 302-2 may associate the query results with the query results for each user. Because similar queries may have been collapsed into a uniform query, the query results for the unique queries that may have been associated with each query from a user. The query results for the new queries are then sent to query results communicator 304-2.

Query results communicator 304-1 is configured to send the query results for the base queries used to search the new data to users. In one embodiment, query results communicator 304-1 may compare the new query results with previous query results. For example, a news content provider may send the same news article with an updated news article. A search may thus yield the new news article and old news article. The new news article may be sent to users but the old news article may be the same as what was sent to users before. Thus, by comparing the new results with the previous results, results that are the same may be removed (i.e., the old news article). In one embodiment, query results communicator 304-1 formats, for each user, the query results before sending the results to the user. This process will be described in more detail below.

Query results communicator 304-2 receives the query results for the new queries that were used to search the new data and the query results for new queries that were used to search the base data. Because the new queries had not been previously used to search the base data, the queries for the new data and base data are combined and sent to users. Thus, the new queries that were received after previous queries are used to search the base data and the new data thereby providing complete search query results to a user. It will be understood that a user may specify that a new query should be used to search none of or only a part of the base data. For example, the new query may search data created after a certain time instead of all data in database 208. Query results communicator 304-2 may also format, for each user, the query results that are sent to users. The formatting process will be described in more detail below.

After the queries have been performed against the new data and the base data, the new data is added to the base data in database 208. The new queries may also be considered base queries when another search is performed. Thus, the new data that is added to the base data is not searched again using the base queries. Over time, additional new data may be received and the process as described above will be used to query the new data and the base data.

Figure 4:
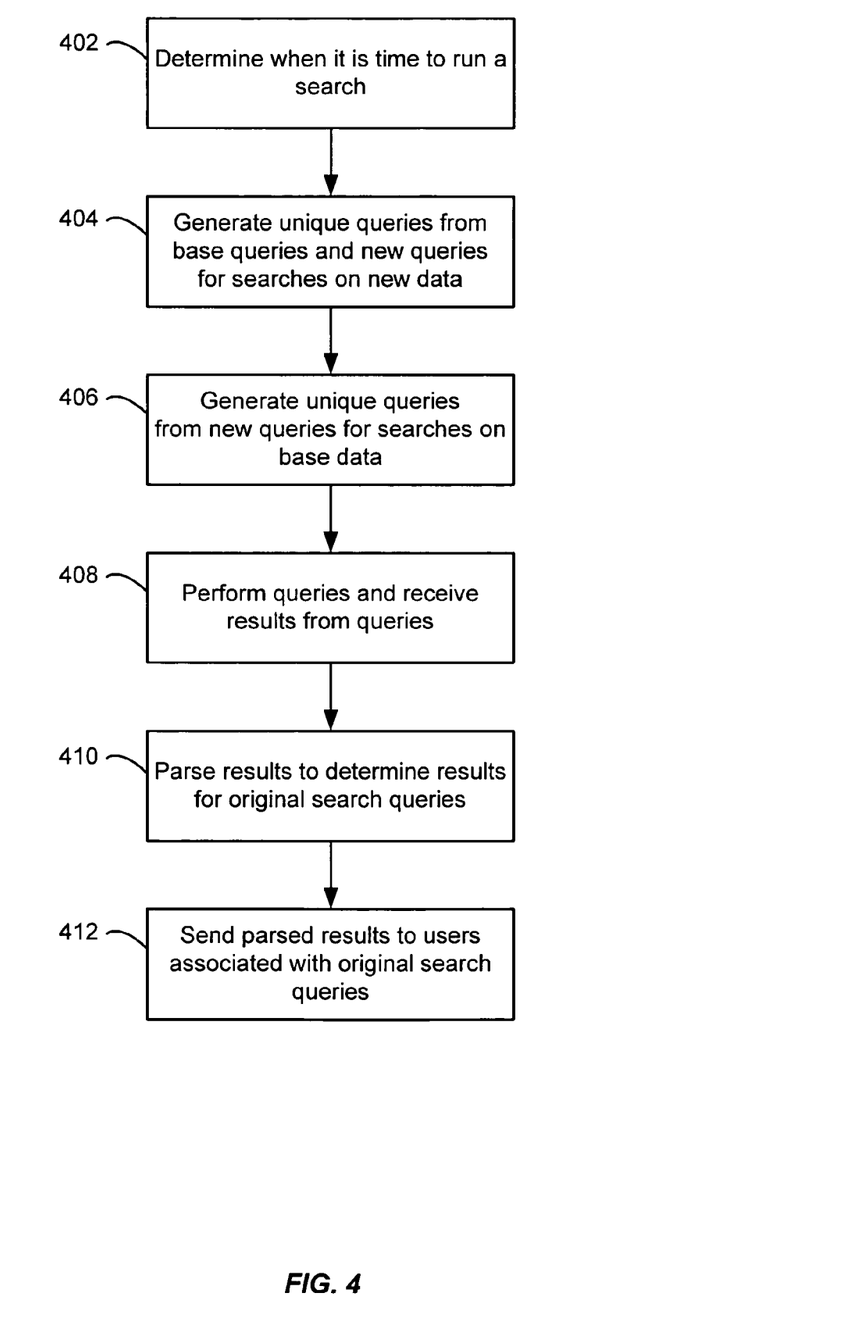
FIG. 4 depicts a simplified flowchart for performing search queries according to one embodiment of the present invention.

FIG. 4 depicts a simplified flowchart 400 for performing search queries according to one embodiment of the present invention. In step 402, search engine 104 determines when it is time to perform a search. In one embodiment, searches may be run periodically, such as every hour, once a day, etc. When it is time to perform a search, search engine 104 determines all queries that are eligible to have searches performed.

In step 404, unique queries are generated from base queries and new queries for searches on the new data. Unique queries are created so that multiple searches for similar queries are not performed on the new data.

In step 406, unique queries are generated from the new queries for searches on the base data. The base data is searched because the new queries have not been previously run against the base data.

In step 408, the queries generated in steps 404 and 406 are used to perform searches against the new data and base data, respectively. In one embodiment, results are received from queries that are performed on the new data and queries that are performed on the base data.

In step 410, the results are parsed to determine the results for the original search queries. As mentioned above, the unique queries are generated from one or more original search queries. The queries results for the unique queries are then associated with the appropriate original search queries for each user.

In step 412, the search results are sent to users associated with the original search queries. The search results may be sent to users based on user preferences and devices that the user may be using to view the search results.

Figure 5:
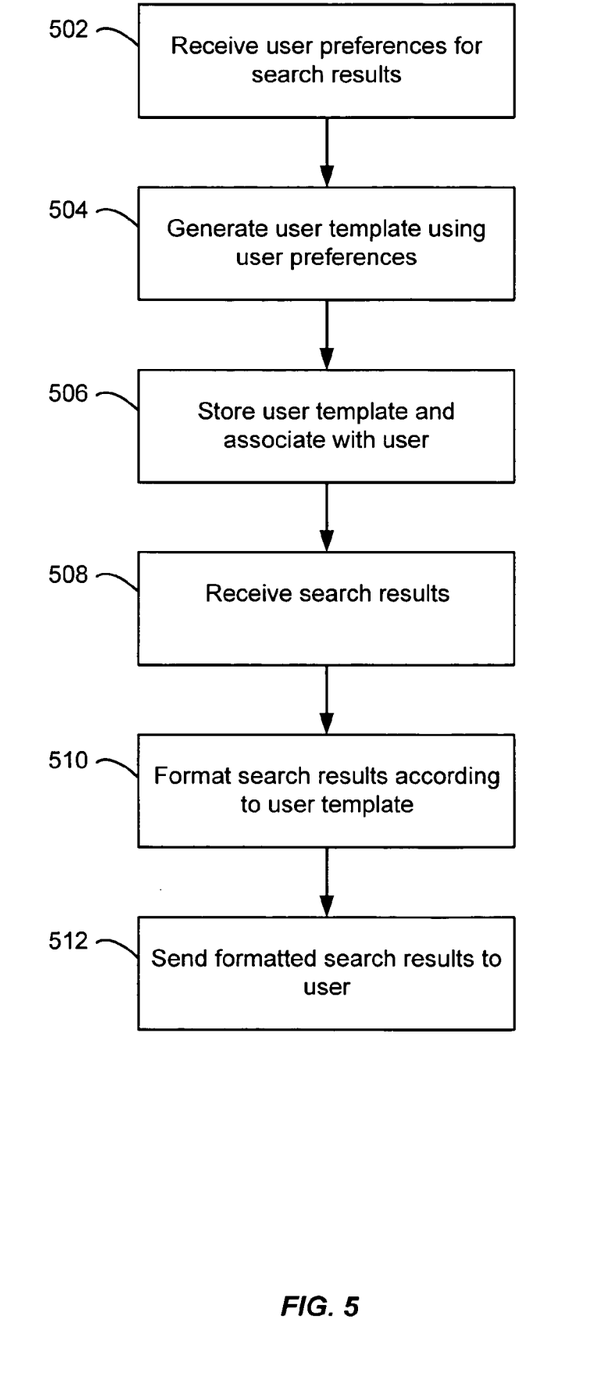
FIG. 5 depicts a simplified flowchart of a method for formatting search results according to one embodiment of the present invention.

FIG. 5 depicts a simplified flowchart 500 of a method for formatting search results according to one embodiment of the present invention. In step 502, preferences for the search results are received. For example, a user may input preferences to indicate how search results should be formatted. The preferences may include the device in which search results may be viewed, a carrier that may transfer the results, any device limitations, carrier limitations, and any other viewing constraints or preferences may be received. A carrier may be a telephone company or a service provider that provides access to the device the user is using to view the search results. A constraint may be that a screen may only be able to display a certain amount of text, a device may only be able to display text and not graphics, etc. Depending on the preferences, different messages may be formulated for the search results. For example, if only text may be displayed, a URL, to a web page may be sent to a device. Also, a limited number of results may be sent if a device can only display a certain amount of text.

In step 504, a user template using the user preferences is generated. The user template includes the user preferences in addition to any user information that is needed to contact the user, such as a telephone number, email address, etc. Also, the user template may include the user search queries that a user wants to periodically run.

In step 506, the user template is stored and associated with the user. In one embodiment, the user template may be stored in an index. The template may be indexed using an identifier for the user.

In step 508, when a search is run, the search results are received and associated with the user queries stored with the user template.

In step 510, the search results are formatted according to the user preferences in the user template. Thus, different users may receive the same search results, but have them formatted differently.

In step 512, the formatted search results are sent to a user. In one embodiment, a search result may be sent according to a user preference, such as search results may be sent through email, instant message, SMS, MMS, etc.

In one embodiment, techniques for formatting search results are disclosed in Alerts Application #3.

FIG. 6 depicts an example of a query 602 and query results 604 according to one embodiment of the present invention. Query 602 may be used to search data in database 206 or 208.

Search result 604 is received for query 602. A header 606 indicates information about the search performed. In this case, the total hits received was "148666".

A first result 608 and a second result 610 are shown that indicate information that may be sent to the user. A URL where the search result may be stored is included.

Accordingly, embodiments of the present invention provide search techniques that may be used for searches that are periodically performed. In one embodiment, a database includes new data and base data. The base data includes data that has already been searched. The new data includes information that has not been searched yet. In addition to processing base search queries, new search queries may be also processed. The new and base search queries are used to search the new data, and the new search queries are used to search the base data. The search results are then communicated to different users. Thus, users that are associated with base queries may receive search results from the new data that has been received. Also, users associated with new queries may receive search results from the new data and base data.

Embodiments of the present invention thus do not periodically search the same data that has already been searched. By separating new data and base data, periodic searches may be performed more efficiently because base queries only search new data. In addition to efficiently searching base data and new data, the search results may be formatted according to user preferences.

The present invention can be implemented in the form of control logic in software or hardware or a combination of both. The control logic may be stored in an information storage medium as a plurality of instructions adapted to direct an information processing device to perform a set of steps. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of providing search results, the method comprising the computer-implemented steps of:
   prior to or at a first particular time,
      generating an initial set of search results, said generating comprising performing an initial set of one or more searches on a first set of data, said initial set of one or more searches being based on a first set of search queries; wherein the first set of search queries includes a first query for which the set of initial search results contains an initial search result;
   at the first particular time, transmitting the initial search result to a first user associated with the first query;
   between the first particular time and a second particular time, the second particular time occurring after the first particular time, receiving a second set of search queries and a second set of data;
      wherein the second set of search queries is different from the first set of search queries;
      wherein the second set of search queries includes a second query that is different than the first query;
   after the second particular time, generating a first set of search results that is different than the initial set of search results;
      wherein generating the first set of search results comprises performing a first set of one or more searches on the second set of data, but not the first set of data, based on the first set of search queries;
      wherein the first set of search results includes a first search result associated with the first search query; and
   after the second particular time, generating a second set of search results that is different than both the initial set of search results and the first set of search results;
      wherein generating the second set of search results comprises performing second set of one or more searches on the first set of data, based on the second set of search queries;
      wherein the second set of search results includes a second search result associated with the second search query;
   transmitting the first search result to the first user associated with the first query; and
   transmitting the second search result to a second user associated with the second query;
   wherein performing the first set of one or more searches comprises:
      identifying sets of one or more similar search queries from at least the first set of search queries;
      for each of the sets of one or more similar search queries, determining a unique search query; and
      generating a set of unique search results by, for each unique search query, executing the unique search query against the second set of data, but not the first set of data;
   wherein generating the first set of search results further comprises associating each search query that is both in the first set of search queries and in one of the sets of one or more similar search queries with a corresponding unique search result from the set of unique search results;
   wherein identifying the sets of one or more similar search queries further comprises:
      identifying at least one or more of the sets of one or more similar search queries from the first set of search queries and the second set of search queries; wherein one of the sets of similar search queries comprises both the first search
   query and the second search query; and
   wherein generating the second set of search results further comprises:
      for each search query that is both in the second set of search queries and in one of the sets of one or more similar search queries: associating the search query with a corresponding unique search result from the set of unique search results; and
   combining the corresponding unique search result with a search result generated during the second set of one or more searches for the search query;
   wherein the method is performed by one or more computing devices.

2. The method of claim 1, wherein:
   the second set of data contains one or both of a set of new data items and a set of updated data items;
   the set of updated data items is a set of updated versions of data items found in the first set of data; and
   the set of new data items is a set of data items that are different from any data item in the first set of data.

3. The method of claim 1 wherein the first and second sets of data are indexed collections of web-based documents.

4. The method of claim 1, further comprising, prior to transmitting the first search result, formatting the first search result according to first user preferences specified for the first user.

5. The method of claim 1, wherein performing the second set of one or more searches comprises performing a third set of one or more searches on both the first set of data and the second set of data, based on a set of search queries that belong to the second set of search queries but not one of the sets of one or more similar search queries.

6. The method of claim 1, wherein:
each query in the first set of search queries is associated with one or more users from a first set of users, the first set of users including at least the first user; and
each query in the second set of search queries is associated with one or more users from a second set of users, the second set of users including at least the second user.

7. The method of claim 6, wherein:
the first set of queries is a set of persistent queries issued by the first set of users prior to the first particular time; and
the second set of queries is a set of persistent queries issued by the second set of users between the first particular time and the second particular time.

8. One or more computer-readable storage media storing one or more sequences of instructions which, when executed by one or more processors, causes the one or more processors to perform prior to or at a first particular time,
generating an initial set of search results, said generating comprising performing an initial set of one or more searches on a first set of data, said initial set of one or more searches being based on a first set of search queries;
wherein the first set of search queries includes a first query for which the set of initial search results contains an initial search result;
at the first particular time, transmitting the initial search result to a first user associated with the first query;
between the first particular time and a second particular time, the second particular time occurring after the first particular time, receiving a second set of search queries and a second set of data;
wherein the second set of search queries is different from the first set of search queries;
wherein the second set of search queries includes a second query that is different than the first query;
after the second particular time, generating a first set of search results that is different than the initial set of search results;
wherein generating the first set of search results comprises performing a first set of one or more searches on the second set of data, but not the first set of data, based on the first set of search queries;
wherein the first set of search results includes a first search result associated with the first search query; and
after the second particular time, generating a second set of search results that is different than both the initial set of search results and the first set of search results;
wherein generating the second set of search results comprises performing a second set of one or more searches on the first set of data, based on the second set of search queries;
wherein the second set of search results includes a second search result associated with the second search query;
transmitting the first search result to the first user associated with the first query; and transmitting the second search result to a second user associated with the second query;
wherein performing the first set of one or more searches comprises:
identifying sets of one or more similar search queries from at least the first set of search queries;
for each of the sets of one or more similar search queries, determining a unique search query; and
generating a set of unique search results by, for each unique search query, executing the unique search query against the second set of data, but not the first set of data:
wherein generating the first set of search results further comprises associating each search query that is both in the first set of search queries and in one of the sets of one or more similar search queries with a corresponding unique search result from the set of unique search results;
wherein identifying the sets of one or more similar search queries further comprises
identifying at least one or more of the sets of one or more similar search queries from the first set of search queries and the second set of search queries; wherein one of the sets of similar search queries comprises both the first search query and the second search query; and
wherein generating the second set of search results further comprises:
for each search query that is both in the second set of search queries and in one of the sets of one or more similar search queries: associating the search query with a corresponding unique search result from the set of unique search results; and
combining the corresponding unique search result with a search result generated during the second set of one or more searches for the search query; wherein the method is performed by one or more computing devices.

9. The one or more computer-readable storage media of claim 8, wherein: each query in the first set of search queries is associated with one or more users from a first set of users, the first set of users including at least the first user; and each query in the second set of search queries is associated with one or more users from a second set of users, the second set of users including at least the second user.

10. The one or more computer-readable storage media of claim 9, wherein: the first set of queries is a set of persistent queries issued by the first set of users prior to the first particular time; and the second set of queries is a set of persistent queries issued by the second set of users between the first particular time and the second particular time.

11. The one or more computer-readable storage media of claim 8, wherein: the second set of data contains one or both of a set of new data items and a set of updated data items; the set of updated data items is a set of updated versions of data items found in the first set of data; and the set of new data items is a set of data items that are different from any data item in the first set of data.

12. The one or more computer-readable storage media of claim 8 wherein the first and second sets of data are indexed collections of web-based documents.

13. The one or more computer-readable storage media of claim 8, further storing instructions that, when executed by the one or more processors, further cause performance of, prior to transmitting the first search result, formatting the first search result according to first user preferences specified for the first user.

14. The one or more computer-readable storage media of claim 8, wherein performing the second set of one or more searches comprises performing a third set of one or more searches on both the first set of data and the second set of data, based on a set of search queries that belong to the second set of search queries but not one of the sets of one or more similar search queries.

* * * * *